United States Patent
Kang et al.

(10) Patent No.: US 11,789,622 B2
(45) Date of Patent: Oct. 17, 2023

(54) METHOD, DEVICE AND COMPUTER PROGRAM PRODUCT FOR STORAGE MANAGEMENT

(71) Applicant: EMC IP Holding Company LLC, Hopkinton, MA (US)

(72) Inventors: Jianbin Kang, Beijing (CN); Jian Gao, Beijing (CN); Hongpo Gao, Beijing (CN); Xinlei Xu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/191,910

(22) Filed: Mar. 4, 2021

(65) Prior Publication Data
US 2022/0129174 A1    Apr. 28, 2022

(30) Foreign Application Priority Data
Oct. 22, 2020 (CN) .......................... 202011139795.6

(51) Int. Cl.
    *G06F 3/06* (2006.01)
(52) U.S. Cl.
    CPC ............ *G06F 3/0631* (2013.01); *G06F 3/065* (2013.01); *G06F 3/0619* (2013.01); *G06F 3/0689* (2013.01)
(58) Field of Classification Search
    CPC ...... G06F 3/0631; G06F 3/0619; G06F 3/065; G06F 3/0689
    See application file for complete search history.

(56) References Cited

U.S. PATENT DOCUMENTS

| | | |
|---|---|---|
| 10,146,624 B1 | 12/2018 | Gong et al. |
| 10,324,662 B2 | 6/2019 | Hardy et al. |
| 2005/0144512 A1* | 6/2005 | Ming .................. G06F 11/1076 714/6.12 |
| 2008/0109601 A1* | 5/2008 | Klemm ................. G06F 3/0632 711/E12.001 |
| 2019/0004900 A1* | 1/2019 | Gao ...................... G06F 3/0607 |
| 2019/0129614 A1* | 5/2019 | Dalmatov ............. G06F 3/0689 |
| 2019/0220231 A1 | 7/2019 | Xu et al. |
| 2021/0191619 A1 | 6/2021 | Dalmatov |

FOREIGN PATENT DOCUMENTS

| | | |
|---|---|---|
| CN | 108733314 A | 11/2018 |
| CN | 109725823 A | 5/2019 |
| CN | 109725831 A | 5/2019 |
| CN | 110058787 A | 7/2019 |

OTHER PUBLICATIONS

China National Intellectual Property Administration (CNIPA); Search Report for CN 20201011139795.6; Aug. 21, 2023; 2 pages

* cited by examiner

*Primary Examiner* — Jason W Blust
(74) *Attorney, Agent, or Firm* — BainwoodHuang

(57) ABSTRACT

Techniques perform storage management. The techniques involve: in response to a target request for a target redundant array of independent disks (RAID), determining that data in a first storage block associated with the target RAID needs to be moved or copied, wherein the target request includes one of the following: a restriping request, a type conversion request, or a rebalancing request; creating an intermediate RAID associated with an idle second storage block; and copying the data in the first storage block to a corresponding storage space in the intermediate RAID to write at least part of the data in the second storage block. Based on this mode, RAID restriping, type conversion, or rebalancing can be implemented efficiently.

19 Claims, 7 Drawing Sheets

METHOD, DEVICE AND COMPUTER PROGRAM PRODUCT FOR STORAGE MANAGEMENT

CROSS-REFERENCE TO RELATED APPLICATION

This application claims priority to Chinese Patent Application No. CN202011139795.6, on file at the China National Intellectual Property Administration (CNIPA), having a filing date of Oct. 22, 2020, and having "METHOD, DEVICE AND COMPUTER PROGRAM PRODUCT FOR STORAGE MANAGEMENT" as a title, the contents and teachings of which are herein incorporated by reference in their entirety.

TECHNICAL FIELD

Embodiments of the present disclosure relate to the field of computers, and more particularly, to a storage management method and device, and a computer program product.

BACKGROUND

In recent years, with the development of computer technology, people pay more and more attention to the security of data storage. Some traditional solutions use a Redundant Array of Independent Disks (RAID) to improve the reliability of data storage. During the use of the RAID, due to performance or reliability considerations, data in some disks needs to be moved to another disk. Such data movement may involve access to a large amount of RAID metadata, which lowers the efficiency.

SUMMARY OF THE INVENTION

The embodiments of the present disclosure provide a solution for storage management. According to a first aspect of the present disclosure, a storage management method is proposed.

The method includes: in response to a target request for a target redundant array of independent disks (RAID), determining that data in a first storage block associated with the target RAID needs to be moved or copied, wherein the target request includes one of the following: a restriping request, a type conversion request, or a rebalancing request; creating an intermediate RAID associated with an idle second storage block; and copying the data in the first storage block to a corresponding storage space in the intermediate RAID to write at least part of the data in the second storage block.

According to a second aspect of the present disclosure, a device for storage management is proposed. The device includes: at least one processing unit; and at least one memory coupled to the at least one processing unit and storing instructions for execution by the at least one processing unit. The instructions, when executed by the at least one processing unit, cause the device to perform actions including: in response to a target request for a RAID, determining that data in a first storage block associated with the target RAID needs to be moved or copied, wherein the target request includes one of the following: a restriping request, a type conversion request, or a rebalancing request; creating an intermediate RAID associated with an idle second storage block; and copying the data in the first storage block to a corresponding storage space in the intermediate RAID to write at least part of the data in the second storage block.

In a third aspect of the present disclosure, a computer program product is provided. The computer program product is tangibly stored in a non-transitory computer storage medium and includes machine-executable instructions, wherein when run in a device, the machine-executable instructions cause the device to perform any step of the method described according to the first aspect of the present disclosure.

The Summary of the Invention section is provided to introduce the choice of concepts in a simplified form, which will be further described in the following Detailed Description. The Summary of the Invention section is not intended to identify key features or essential features of the present disclosure, nor is it intended to limit the scope of the present disclosure.

BRIEF DESCRIPTION OF THE DRAWINGS

The above and other objectives, features, and advantages of the present disclosure will become more apparent by describing the example embodiments of the present disclosure in more detail in combination with the accompanying drawings. In the example embodiments of the present disclosure, the same reference numerals generally represent the same parts.

DETAILED DESCRIPTION

Figure 1:
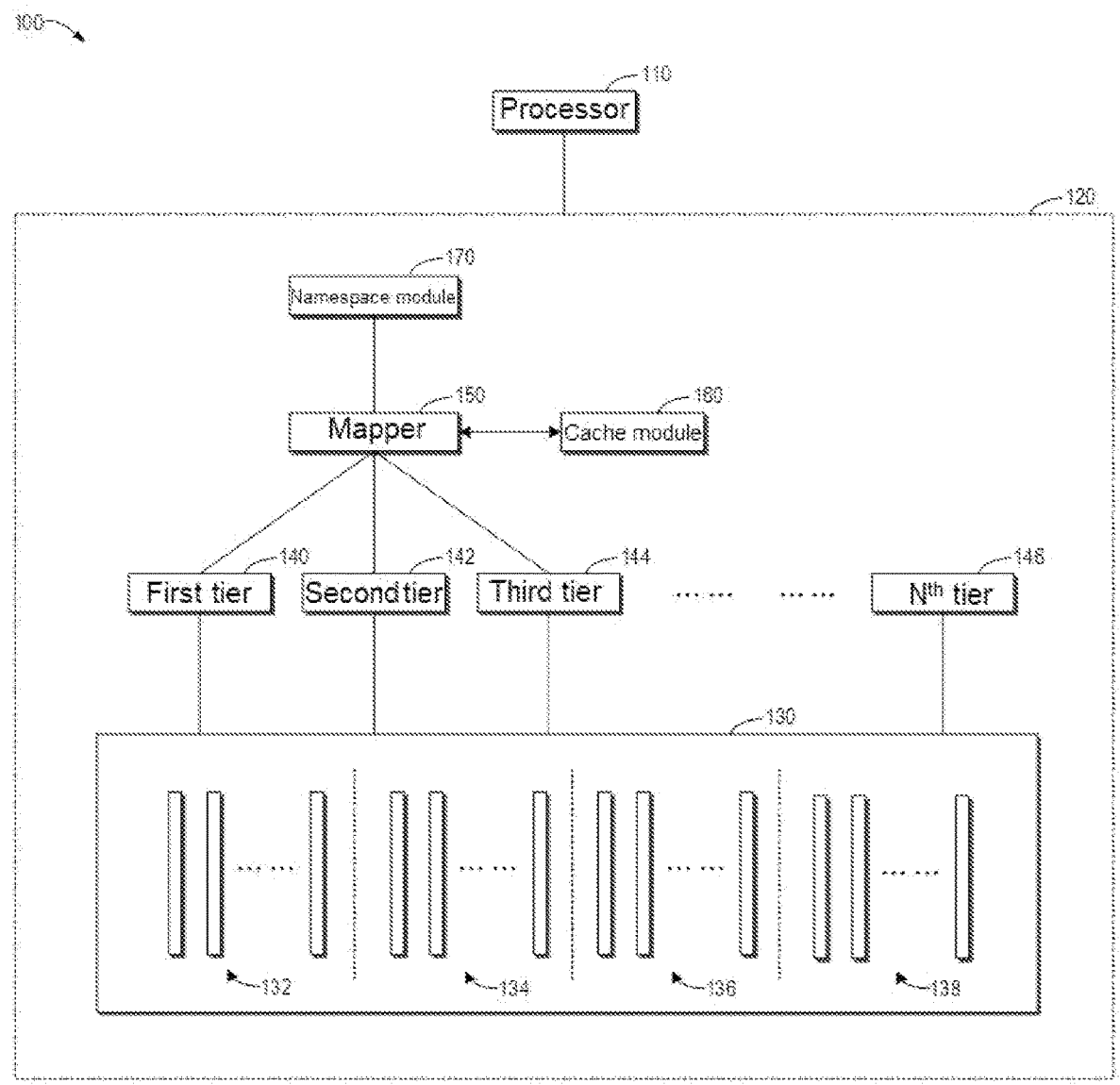
FIG. 1 illustrates a schematic diagram of an example storage system in which the embodiments of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Hereinafter, preferred embodiments of the present disclosure will be described in more detail with reference to the accompanying drawings. Although the preferred embodiments of the present disclosure are shown in the drawings, it should be understood that the present disclosure can be implemented in various forms and should not be limited by the embodiments set forth herein. Rather, these embodiments are provided so that the present disclosure will be more thorough and complete, and will fully convey the scope of the present disclosure to those skilled in the art.

As used herein, the term "including" and variations thereof mean open-ended inclusion, that is, "including but not limited to." Unless specifically stated, the term "or" means "and/or." The term "based on" means "based at least in part on." The terms "one example embodiment" and "one embodiment" mean "at least one example embodiment." The term "another embodiment" means "at least one further embodiment." The terms "first," "second," etc., may refer to different or the same objects. Other explicit and implicit definitions may also be included below.

FIG. 1 shows a schematic diagram of example storage system 100 in which an embodiment of the present disclosure may be implemented. As shown in FIG. 1, storage system 100 may include processor 110 and storage structure 120. Processor 110 is configured to perform operations related to storage system 100, such as an input/output (I/O) operation, a control operation, and a management operation. More generally, with the cooperation of necessary hardware and software, processor 110 may execute any operation related to storage system 100. In addition, storage structure 120 is configured to organize and manage storage resources of storage system 100 in an appropriate organizational manner, such as various physical storage disks.

As shown in FIG. 1, storage structure 120 includes storage block pool 130, which may be configured to manage all storage disks in storage structure 120. The storage disks in storage block pool 130 will be organized into a plurality of RAID recovery sets (RRS) 132, RRS 134, RRS 136, RRS 138, and the like. Each RRS is a failure domain, which means that if a storage disk in one RRS (for example, RRS 132) fails, the failure will not affect the recovery of other RRSs. In a typical storage system, one RRS may include up to 25 storage disks. However, the embodiments of the present disclosure are not limited to the above specific values. In other embodiments, the RRS may include any suitable number of storage disks.

In storage block pool 130, each storage disk may be divided into storage blocks of a fixed size. The size of each storage block may be set to 4 gigabytes (GB). However, the embodiments of the present disclosure are not limited to the above specific values. In other embodiments, the size of a storage block in a storage disk may be set to any suitable size. It can be seen that storage block pool 130 may be regarded as being composed of a set of storage blocks, and for this reason, it is called a storage block pool.

In storage block pool 130, a plurality of storage blocks from different storage disks may form a small RAID (as opposed to a large RAID composed of a plurality of physical storage disks). The RAID may be of any suitable type. For example, if a RAID group is created with RAID-5 having a type of 4+1, processor 110 may allocate five idle storage blocks from different storage disks, and combine the five storage blocks into a small RAID. In some cases, it may be required that all storage blocks in one RAID come from the same RRS. In addition, each RAID may include a plurality of RAID strips. The size of each RAID strip may be 2 megabytes (MB), which may also be called a physical large block (PLB). It will be understood that the embodiments of the present disclosure are not limited to the above specific values. In other embodiments, the size of a RAID strip may be set to any suitable size.

In addition, as shown in FIG. 1, storage block pool 130 may exhibit or provide some tiers for use by other components, including first tier 140, second tier 142, third tier 144, . . . , Nth tier 146 (N is a natural number), and the like. Each tier may be composed of a plurality of RAID groups. For each tier, different RAID policies may be applied based on the type of data stored. Generally, all RAIDS within the same tier may have the same RAID policy, which means the same RAID width and RAID type. Each tier may be expanded as needed, that is, processor 110 may dynamically allocate a new RAID and add it to a certain tier.

Storage structure 120 may also include mapper 150. Mapper 150 is a core component in storage structure 120, which treats each tier as a flat linear physical address space. On the other hand, mapper 150 provides a single flat linear logical address space to namespace module 170. In some cases, the logical address space may be up to 8 exabytes (EB). As an example, mapper 150 may use a B+ tree data structure to maintain mapping between a logical address and a physical address in a granularity of 4K pages. It will be understood that the embodiments of the present disclosure are not limited to the above specific values and specific data structures. In other embodiments, the size of the above logical address space and the granularity of the mapper may be set to any suitable values, and mapper 150 may use other appropriate data structures to maintain the mapping between the logical address and the physical address.

Storage structure 120 may also include cache module 160. Cache module 160 may provide a cache function in a memory (not shown), which may have two instances in storage system 100. One instance is for user data, and the other instance is for metadata. Cache module 160 may provide mapper 150 with a transaction operation function. It will be understood that the embodiments of the present disclosure are not limited to the above specific examples. In other embodiments, cache module 160 may have any other appropriate number instances for any other appropriate usage. In addition, storage structure 120 may also include the aforementioned namespace module 170. As noted above, namespace module 170 may consume and manage the flat linear logical space (for example, with a size of 8 EB) provided by mapper 150. On the other hand, namespace module 170 may create and provide a storage volume to a host (not shown) of storage system 110 for use by the host.

In some embodiments, a storage disk that is organized and managed by storage structure 120 may include various types of devices having a storage function, including but not limited to, a hard disk drive (HDD), a solid state disk (SSD), a removable disk, a compact disk (CD), a laser disk, an optical disk, a digital versatile disk (DVD), a floppy disk, a blue-ray disk, a serial-attached small computer system Interface (SCSI) storage disk (SAS), a serial advanced technology attachment (SATA) storage disk, any other magnetic storage devices and any other optical storage devices, or any combination thereof.

Similarly, processor 110 may include any device capable of implementing control functions, including but not limited to, special-purpose computers, general-purpose computers, general-purpose processors, microprocessors, microcontrollers, or state machines. Processor 110 may also be implemented as an individual computing device or a combination of computing devices, for example, a combination of a digital signal processor (DSP) and a microprocessor, a plurality of microprocessors, one or more microprocessors combined with a DSP core, or any other such configurations.

It should be understood that FIG. 1 only schematically shows units, modules, or components in storage system 100 related to the embodiments of the present disclosure. In practice, storage system 100 may also include other units, modules, or components for other functions. Accordingly, the embodiments of the present disclosure are not limited to specific devices, units, modules, or components depicted in FIG. 1, but are generally applicable to any storage system based on a RAID technology.

Figure 2:
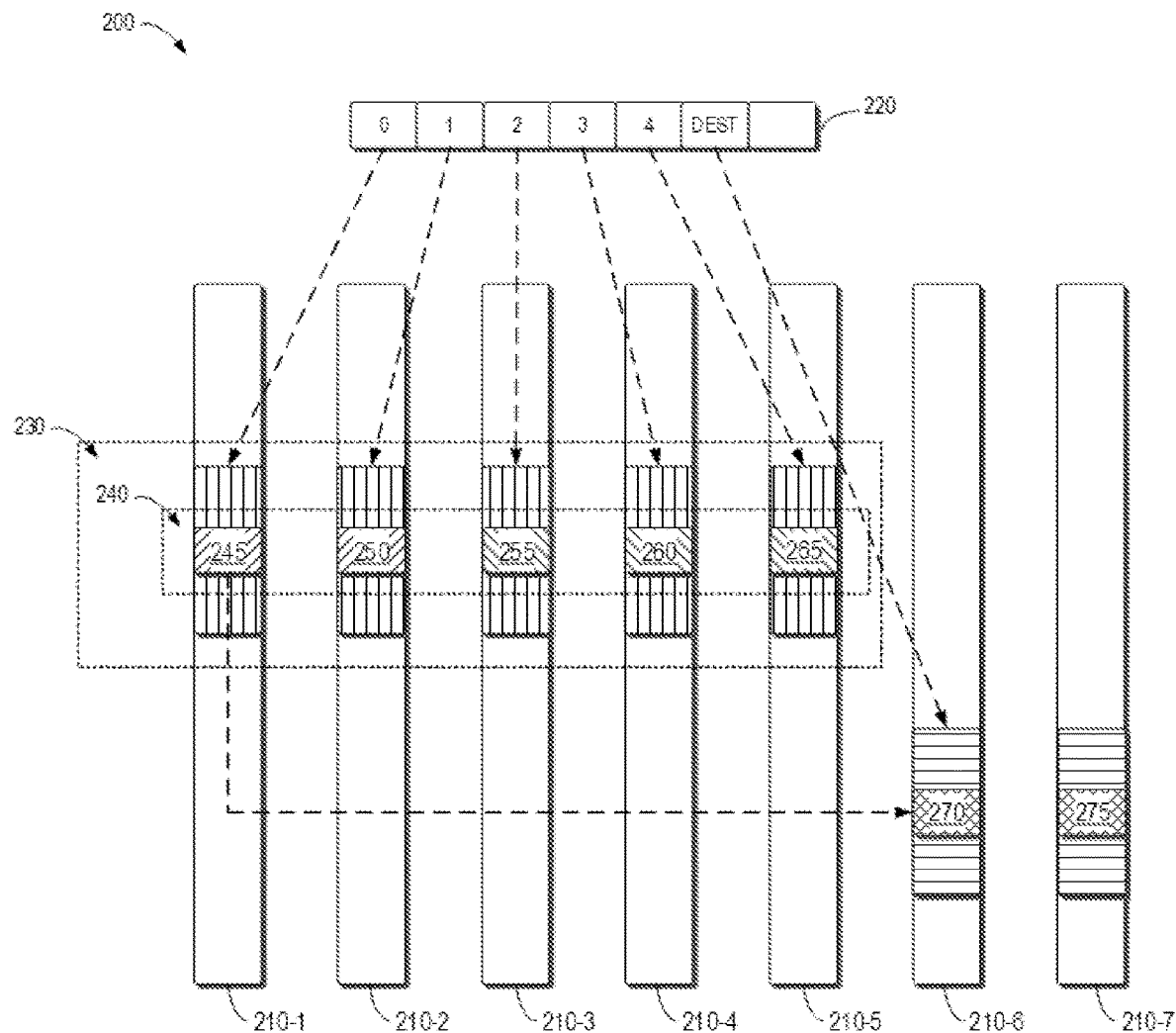
FIG. 2 illustrates a schematic diagram showing traditional restriping.

As discussed above, one RAID may include a plurality of RAID strips. In some cases, for example, due to storage disk failure or in order to allow a plurality of RAIDs to be evenly distributed across a plurality of storage disks, data in some storage disks may need to be moved or copied to another storage disk and restriped. FIG. 2 shows schematic diagram 200 of traditional restriping.

As shown in FIG. 2, RAID 220 is, for example, a RAID with the type of 4+1, which is deployed on storage disks 210-1, 210-2, 210-3, 210-4, and 210-5. Specifically, different spaces in RAID 220 are respectively associated with storage areas in different storage disks. For example, storage area 230 corresponding to RAID 220 includes five different storage areas located on storage disks 210-1, 210-2, 210-3, 210-4, and 210-5.

In addition, RAID 220 may also include a plurality of strips. For example, strip 240 includes storage block 245 in storage disk 210-1, storage block 250 in storage disk 210-2, storage block 255 in storage disk 210-3, storage block 260 in storage disk 210-4, and storage block 265 in storage block 210-5.

In some cases, it is determined that strip 240 needs to be restriped, for example, data in storage block 245 and storage block 250 needs to be moved or copied to other storage disks. According to a traditional solution, it is necessary to move, one by one, storage blocks in a plurality of storage disks that need to be moved. In such a moving process, it is necessary to repeatedly read and write metadata of RAID 210. When there are many storage blocks that need to be moved, due to a large number of repeated RAID metadata access operations, the efficiency of restriping will be greatly affected.

In addition, the same problem also exists in the movement of data in the storage block caused by the conversion of the RAID type or the rebalance of the RAID.

According to the embodiments of the present disclosure, a storage management solution is provided. In this solution, first, when a target request for a target RAID is received, it is determined that data in a first storage block associated with the target RAID needs to be moved or copied, wherein the target request includes one of the following: a restriping request, a type conversion request, or a rebalancing request. Then, an intermediate RAID associated with an idle second storage block is created. Then, the data in the first storage block is copied to a corresponding storage space in the intermediate RAID to write at least part of the data in the second storage block. Based on this mode, RAID restriping, type conversion, or rebalancing can be implemented efficiently.

Figure 3:
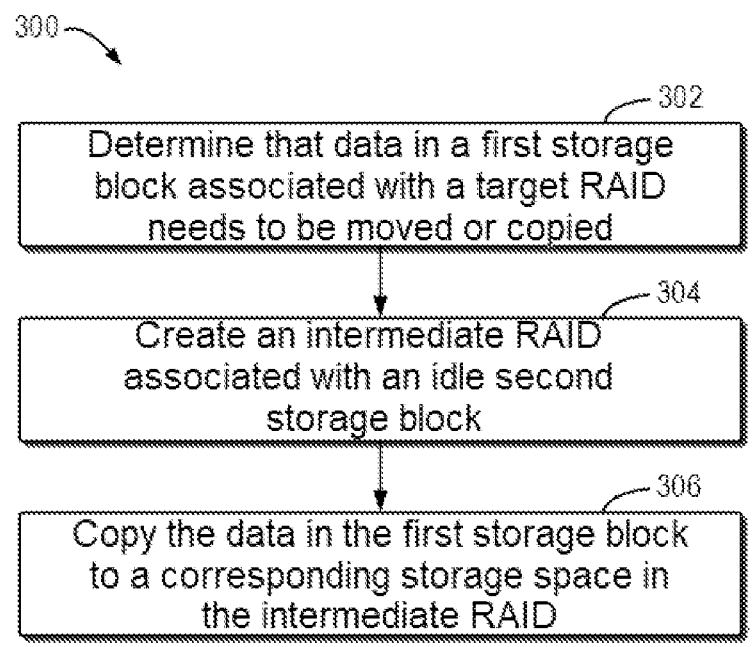
FIG. 3 illustrates a flowchart of a process for storage management according to an embodiment of the present disclosure.

A process for storage management according to an embodiment of the present disclosure will be described below with reference to FIGS. 3 to 6. FIG. 3 shows a flowchart of process 300 for storage management according to some embodiments of the present disclosure. Process 300 may be, for example, implemented by storage system 100 in FIG. 1. A specific flow of process 300 will be described below with reference to FIG. 1.

As shown in FIG. 3, at block 302, in response to a target request for a target RAID, storage system 100 determines that data in a first storage block associated with the target RAID needs to be moved or copied, wherein the target request includes one of the following: a restriping request, a type conversion request, or a rebalancing request.

As discussed above, storage system 100 may, for example, cause the target RAID to be restriped in response to determining that usage across a plurality of storage disks is uneven. Alternatively, storage system 100 may also, for example, perform rebalancing on a plurality of RAIDs including the target RAID in response to adding a new storage disk, that is, adjusting the distribution of the plurality of RAIDs on the storage disks. Alternatively, storage system 100 may receive a request from a user to convert the type of the target RAID. Such requests may cause data in some storage blocks in the target RAID to be moved or copied.

Figure 4:
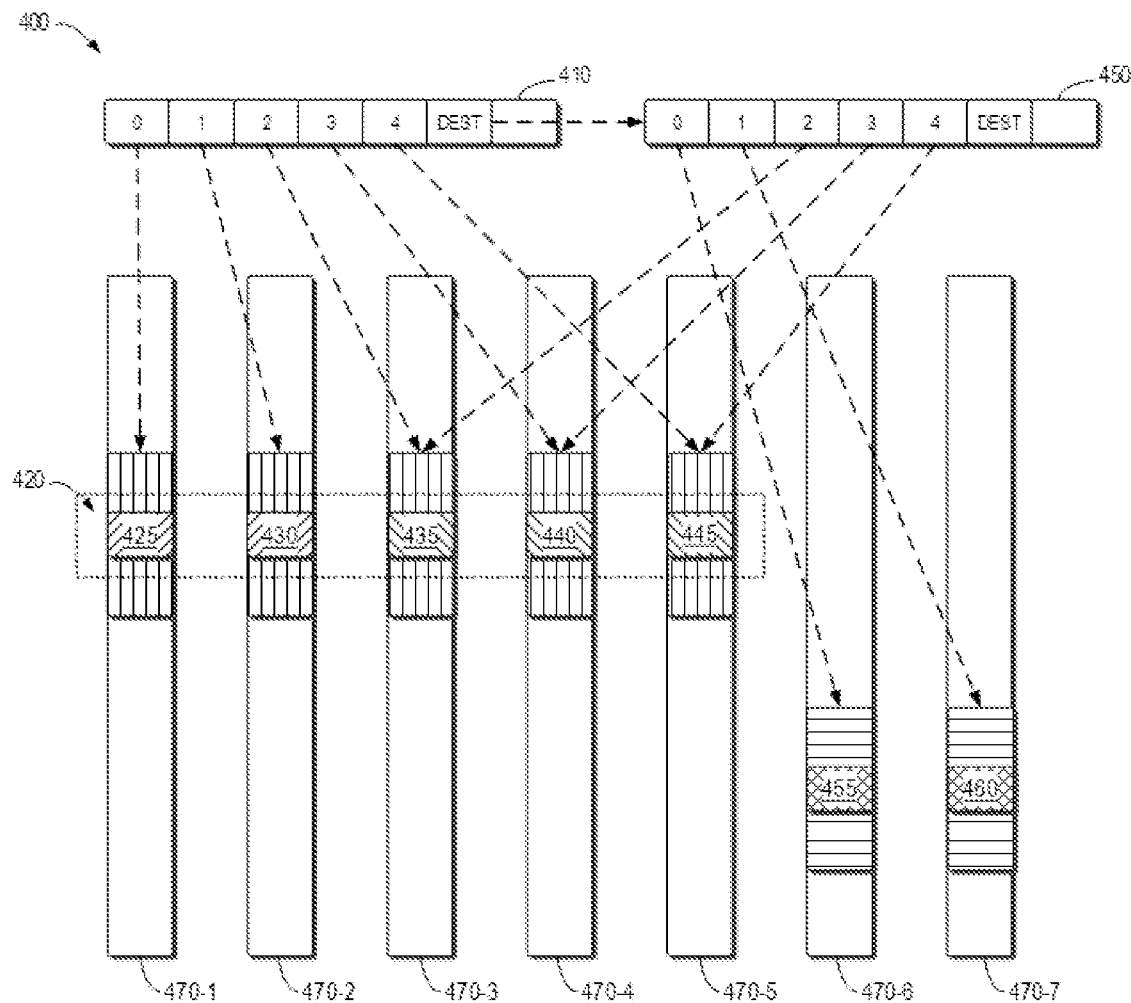
FIG. 4 illustrates a schematic diagram of restriping according to an embodiment of the present disclosure.

The restriping process implemented according to the present disclosure will be described below in conjunction with FIG. 4. As shown in FIG. 4, RAID 410 with the type of 4+1 is, for example, a target RAID that needs to be restriped. Target RAID 410 has strip 420 that needs to be restriped. Strip 420 includes storage block 425 on storage disk 470-1, storage block 430 on storage disk 470-2, storage block 435 on storage disk 470-3, storage block 440 on storage disk 470-4, and storage block 445 on storage disk 470-5.

When it is determined that strip 420 in target RAID 410 needs to be restriped, storage system 100 may determine, for example, that data in storage disk 425 and storage disk 430 (shown by the left diagonal line in the figure) needs to be moved.

At block 304, storage system 100 creates an intermediate RAID associated with an idle second storage block. In some examples, storage system 100 may first allocate an idle second storage block from another storage disk, and use the second storage block to create an intermediate RAID. In some cases, the intermediate RAID may also be called, for example, a shadow RAID.

In some implementations, storage system 100 may also determine that data in the third storage block associated with the target RAID does not need to be moved or copied, and create an intermediate RAID based on the third storage block and the second storage block, so that the intermediate RAID is also associated with the third storage block.

Continuing to refer to the example of FIG. 4, storage system 100 may, for example, allocate storage block 455 in storage disk 470-6 and allocate storage block 460 in storage disk 470-7. In addition, storage system 100 may also determine that data in storage block 435, storage block 440, and storage block 445 does not need to be moved.

Then, storage system 100 may create intermediate RAID 450 based on storage block 455, storage block 460, storage block 435, storage block 440, and storage block 445. In some implementations, storage system 100 may allocate a specific identifier to intermediate RAID 450 or write metadata of intermediate RAID 450 to a specific storage position, so that RAID 450 is invisible to users.

In some implementations, unlike traditionally making DEST metadata in an to-be-processed RAID pointing to the allocated storage block (for example, as shown in FIG. 2), storage system 100 may write the identifier of intermediate RAID 450 in the DEST metadata in target RAID 410 to establish an association between target RAID 410 and intermediate RAID 450.

Continuing to refer to FIG. 3, at block 306, storage system 100 copies the data in the first storage block to a corresponding storage space in the intermediate RAID to write at least part of the data in the second storage block.

Continuing the example of FIG. 4, storage system 100 may then write the data in storage block 425 into corresponding newly allocated storage block 455, and write the data in storage block 430 into corresponding newly allocated storage block 460.

After the data is written, storage system 100 may then use the metadata of the intermediate RAID to update the target RAID, so that the target RAID is associated with the second storage block.

Continuing the example of FIG. 4, storage system 100 may use the metadata part of intermediate RAID 450 to replace the corresponding metadata part of target RAID 410. Target RAID 410 can maintain the original RAID identifier, but disassociate from storage block 425 and storage block 430, and associate with storage block 455 and storage block 460. Based on this mode, restriping of strip 420 in target RAID 410 can be completed.

In this way, the embodiments of the present disclosure can write data that needs to be moved at one time, instead of iteratively performing steps such as data writing and metadata modification for each storage block, thereby improving restriping efficiency.

In some implementations, after completing the metadata update, storage system 100 may remove intermediate RAID 450 and release the storage space of storage block 425 and storage block 430.

In some implementations, during the restriping process, storage system 100 can also receive an access request from the user for strip 420. Specifically, when receiving an access request for a storage block that does not need to be moved or copied, storage system 100 may use target RAID 410 to respond to the access request. When receiving a read request for a storage block that needs to be moved or copied, storage system 100 may use target RAID 410 to respond to the read request. In addition, when receiving a write request for a storage block that needs to be moved or copied, storage system 100 may copy the write request to use target RAID 410 and intermediate RAID 450 to respond to the write request, so that data in storage block 425 in target RAID 410 is consistent with data in corresponding storage block 455.

The restriping process according to an embodiment of the present disclosure has been described above in conjunction with FIG. 4. In addition, storage management process 300 according to an embodiment of the present disclosure is also applicable to a rebalancing process.

For a rebalancing request, storage system 100 may perform data movement with reference to the process described in FIG. 3. Unlike the restriping process, the rebalancing process will make the intermediate RAID visible to users.

In addition, for the rebalancing process, storage system 100 will not allow write requests for the target RAID and the intermediate RAID to avoid data conflicts. Storage system 100 may allow read requests for the target RAID and the intermediate RAID.

In the rebalancing process, after writing the data of a storage block to a newly allocated storage block, unlike the restriping process, storage system 100 does not need to use the metadata of the intermediate RAID to update the target RAID. On the contrary, after the data copy is completed, storage system 100 may remove the target RAID.

Specifically, storage system 100 may, for example, disassociate (or decouple) the target RAID and the corresponding storage block. Such a process is also called unmap. Then, storage system 100 may release a storage block from which data has been moved (that is, the first storage block).

In this way, the embodiments of the present disclosure can also efficiently implement RAID rebalancing, reduce the access to RAID metadata during the rebalancing process, and improve operating efficiency.

Additionally, storage management process 300 according to an embodiment of the present disclosure is also applicable to a RAID type conversion process. The RAID type conversion using storage management process 300 will be described below with reference to FIGS. 5 to 6.

Figure 5:
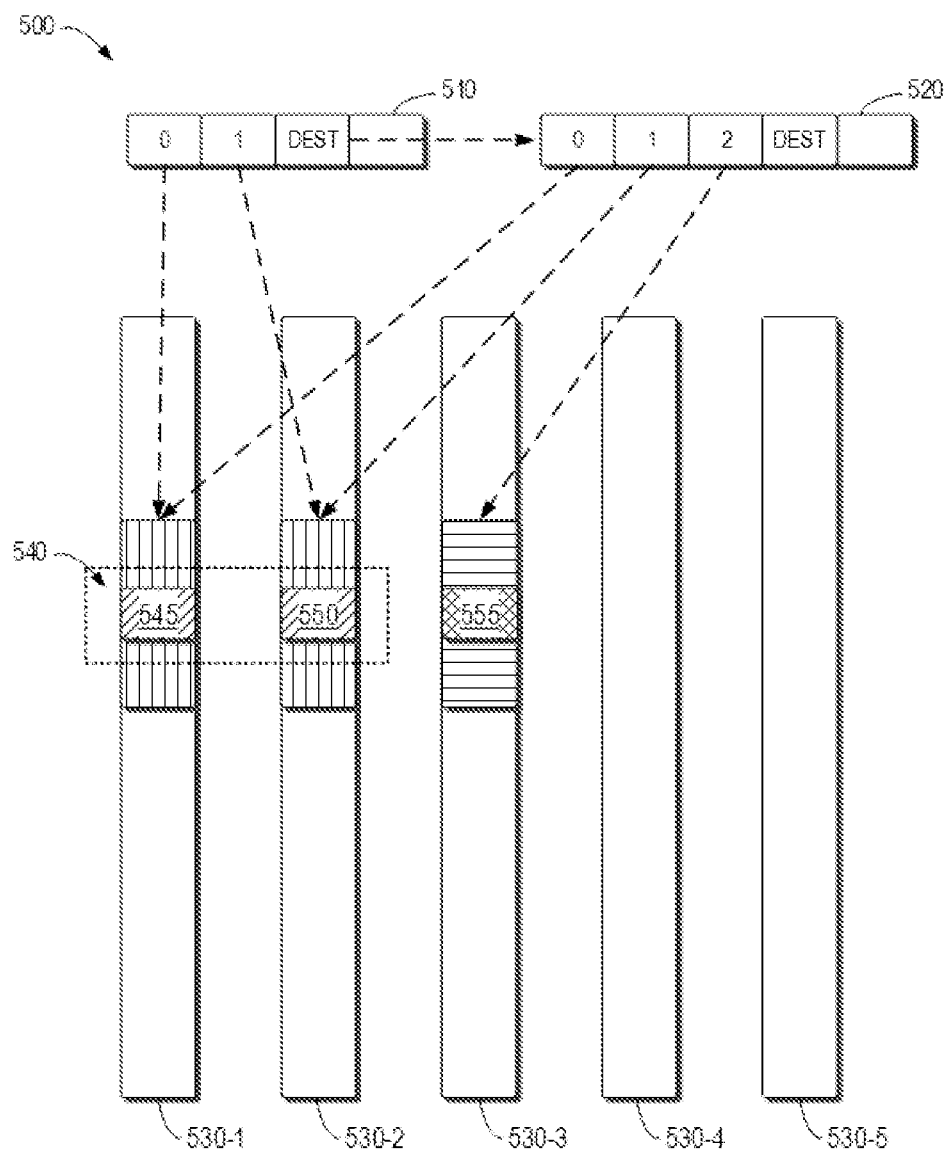
FIG. 5 illustrates a flowchart of a process for RAID type conversion according to an embodiment of the present disclosure.

FIG. 5 shows a process for RAID type conversion according to an embodiment of the present disclosure. As shown in FIG. 5, target RAID 510 requiring type conversion is a RAID with the type of 1+1, which is, for example, deployed in storage disk 530-1 and storage block disk 530-2 in a group of storage disks (storage disks 530-1, 530-2, 530-3, 530-4, and 530-5). Target RAID 510 includes, for example, strip 540. Strip 540 includes storage block 545 located in storage disk 530-1 and storage block 550 located in storage disk 530-2.

When a user desires to convert target RAID 510 from a RAID with the type of 1+1 to a RAID with the type of 1+2, storage system 100 may determine, for example, that data in storage block 540 needs to be copied to storage blocks in other storage disks.

Then, storage system 100 may construct intermediate RAID 100 based on a type conversion request. Specifically, storage system 100 may, for example, allocate storage block 555 in storage disk 530-3, use storage block 545, storage block 550, and storage block 550 to construct intermediate RAID 520, and copy data in storage block 545 to storage block 555.

Then, storage system 100 may use at least part of the metadata of intermediate RAID 520 to update the metadata of target RAID 510, so that target RAID 510 maintains the original RAID identifier, but it is modified to be associated with storage block 545, storage block 550, and storage block 555, so as to complete the conversion of the RAID type.

Figure 6:
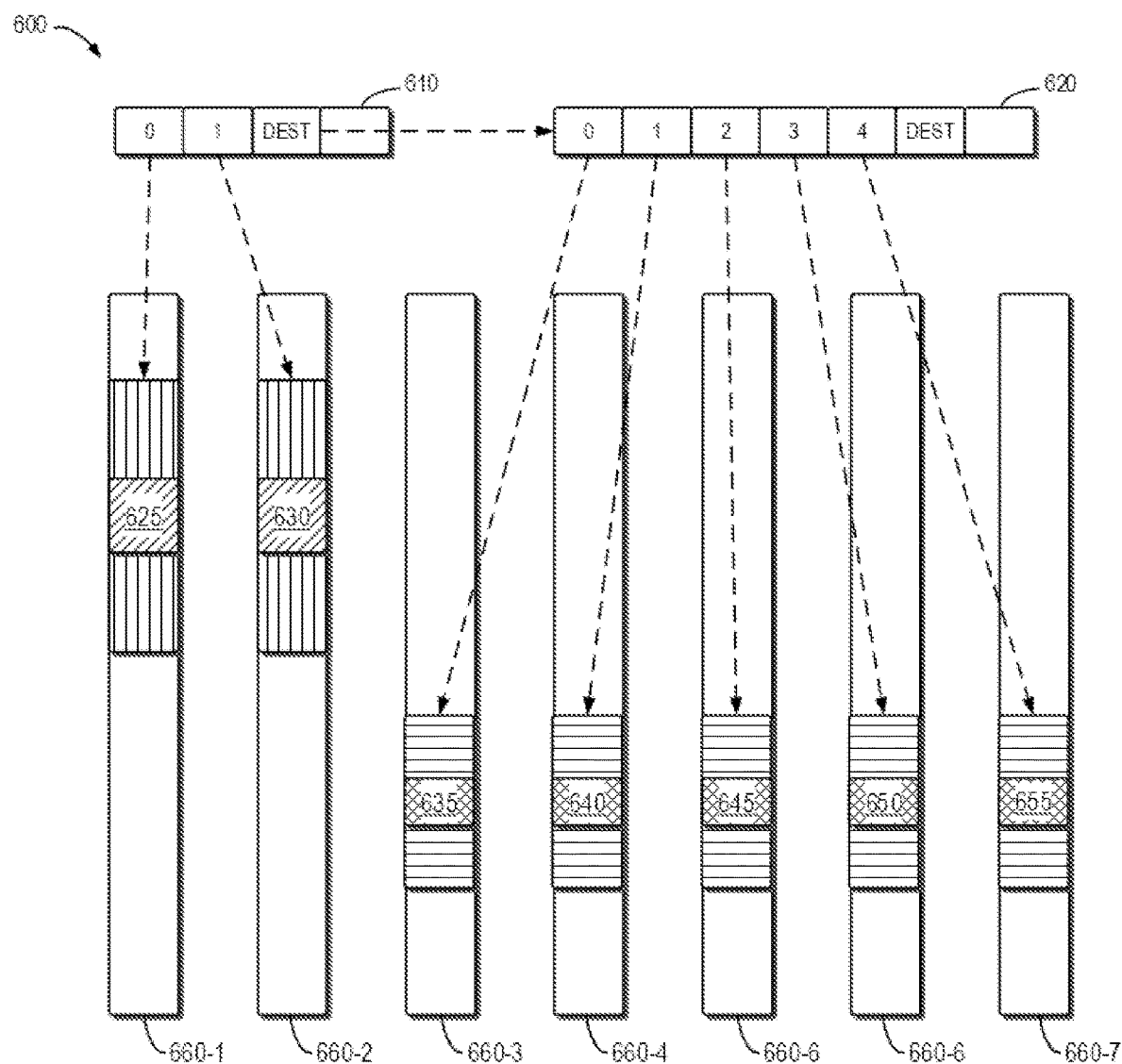
FIG. 6 illustrates a flowchart of a process for RAID type conversion according to another embodiment of the present disclosure.

In some implementations, the RAID type conversion may not be able to utilize original storage blocks. FIG. 6 shows a process for RAID type conversion according to an embodiment of the present disclosure. As shown in FIG. 6, a user desires to convert target RAID 610 with the type of 1+1 into a RAID with the type of 4+1.

In the example of FIG. 6, storage system 100 may, for example, determine that data in storage block 625 and storage block 630 associated with target RAID 610 needs to be moved or copied due to type conversion.

In some implementations, storage system 100 may create intermediate RAID 620 according to the type of 4+1. Specifically, storage system 100 may, for example, first allocate storage blocks of five spaces, such as storage block 635 in storage disk 660-3, storage block 640 in storage disk 660-4, storage block 645 in storage disk 660-5, storage block 650 in storage disk 660-6, and storage block 655 in storage disk 660-7. Then, storage system 100 may use the five storage blocks to construct intermediate RAID 620. It should be understood that although the allocated storage disks are all different from the original storage disks in FIG. 6, the storage system may, for example, also allocate new storage blocks from the original storage disks.

Then, storage system 100 may also write data in storage block 625 in storage disk 660-1 and data in storage block 630 in storage disk 660-2 into corresponding new storage blocks. Specifically, storage block system 100 may write data in target RAID 610 into a logical address corresponding to intermediate RAID 620, so that the data is written into the corresponding new storage block, thereby completing the RAID type conversion.

In some implementations, during the RAID type conversion process shown in FIG. 5 and/or FIG. 6, for example, the intermediate RAID is invisible to a user. In addition, in some implementations, storage system 100 can also receive an access request from a user for the target RAID. Specifically, when receiving an access request for a storage block that does not need to be moved or copied, storage system 100 may use a target to respond to the access request. When receiving a read request for a storage block that needs to be moved or copied, storage system 100 may use the target RAID to respond to the read request. In addition, when receiving a write request for a storage block that needs to be moved or copied, storage system 100 may copy the write request to use the target RAID and the intermediate RAID to simultaneously respond to the write request, so that data in the target RAID is consistent with data in the intermediate RAID.

Based on the solution of the present disclosure, the embodiments of the present disclosure can efficiently realize the copying or movement of data in a RAID, thereby realizing efficient restriping, type conversion and/or rebalancing, so as to improve the efficiency of the storage system.

Figure 7:
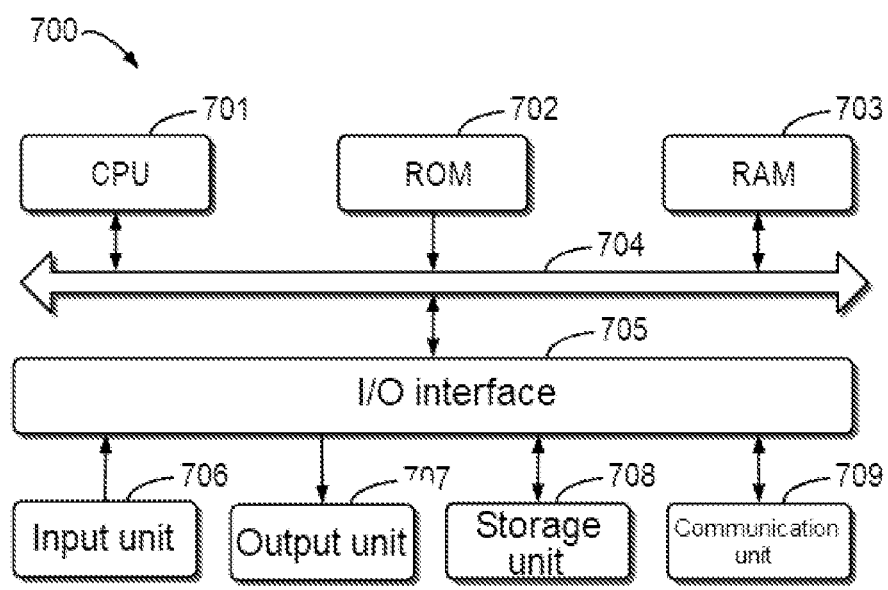
FIG. 7 illustrates a schematic block diagram of an example device that may be configured to implement an embodiment of content of the present disclosure.

FIG. 7 shows a schematic block diagram of example device 700 that may be configured to implement an embodiment of content of the present disclosure. For example, storage system 100 according to an embodiment of the present disclosure may be implemented by device 700. As shown in the figure, device 700 includes central processing unit (CPU) 701 that may perform various appropriate actions and processing according to computer program instructions stored in read-only memory (ROM) 702 or computer program instructions loaded from storage unit 708 to random access memory (RAM) 703. Various programs and data required for operations of device 700 may also be stored in RAM 703. CPU 701, ROM 702, and RAM 703 are connected to each other through bus 704. I/O interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices over a computer network such as the Internet and/or various telecommunication networks.

The various processes and processing procedures described above, such as method 300, may be performed by CPU 701. For example, in some embodiments, method 300 may be implemented as a computer software program that is tangibly included in a machine-readable medium such as storage unit 708. In some embodiments, part or all of the computer program may be loaded and/or installed onto device 700 via ROM 702 and/or communication unit 709. When the computer program is loaded into RAM 703 and executed by CPU 701, one or more actions of method 300 described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electrical storage device, a magnetic storage device, an optical storage device, an electromagnetic storage device, a semiconductor storage device, or any appropriate combination of the above. More specific examples (a non-exhaustive list) of computer-readable storage media include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. Computer-readable storage media used herein are not to be interpreted as transient signals per se, such as radio waves or other freely propagating electromagnetic waves, electromagnetic waves propagating through waveguides or other transmission media (for example, light pulses through fiber optic cables), or electrical signal transmitted via electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The network adapter card or network interface in each computing/processing device receives computer-readable program instructions from the network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages, such as Smalltalk and C++, and conventional procedural programming languages, such as the "C" language or similar programming languages. Computer-readable program instructions may be executed entirely on a user's computer, partly on a user's computer, as a stand-alone software package, partly on a user's computer and partly on a remote computer, or entirely on a remote computer or a server. In the case involving a remote computer, the remote computer may be connected to a user's computer through any kind of network, including a local area network (LAN) or a wide area network (WAN), or it may be connected to an external computer (for example, connected through an Internet using an Internet service provider). In some embodiments, an electronic circuit, for example, a programmable logic circuit, a field programmable gate array (FPGA), or a programmable logic array (PLA), is personalized by utilizing the state information of the computer-readable program instructions, wherein the electronic circuit may execute the computer-readable program instructions so as to implement various aspects of the present disclosure.

Various aspects of the present disclosure are described herein with reference to flowcharts and/or block diagrams of the method, the apparatus (system), and the computer program product according to embodiments of the present disclosure. It should be understood that each block of the flowcharts and/or block diagrams and combinations of blocks in the flowcharts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing the functions/actions specified in one or more blocks in the flowcharts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flowcharts and/or block diagrams.

The computer-readable program instructions may also be loaded onto a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be executed in parallel substantially, or they may be executed in an opposite order sometimes, depending on the functions involved. It also should be noted that each block in the block diagrams and/or flowcharts and a combination of blocks in the block diagrams and/or flowcharts may be implemented using a dedicated hardware-based system for executing specified functions or actions, or may be implemented using a combination of dedicated hardware and computer instructions.

Various implementations of the present disclosure have been described above. The foregoing description is illustrative rather than exhaustive, and is not limited to the disclosed implementations. Numerous modifications and changes are apparent to those of ordinary skill in the art without departing from the scope and spirit of the various illustrated implementations. The selection of terms as used herein is intended to best explain the principles and practical applications of the various implementations or technical improvements of the technologies on the market, or to enable other persons of ordinary skill in the art to understand the implementations disclosed herein.

The invention claimed is:

1. A storage management method, comprising:
in response to a target request for a target redundant array of independent disks (RAID), determining that data in a first storage block associated with the target RAID needs to be moved or copied, wherein the target request comprises one of the following: a restriping request, a type conversion request, or a rebalancing request;
creating an intermediate RAID associated with an idle second storage block;
recording, in metadata of the target RAID, a RAID identifier of the intermediate RAID indicating storage blocks to be included in the target RAID, the recorded RAID identifier being a different RAID identifier than a RAID identifier of the target RAID;
after recording the RAID identifier, copying the data in the first storage block to a corresponding storage space in the intermediate RAID to write at least part of the data in the second storage block; and
after copying the data in the first storage block to a corresponding storage space in the intermediate RAID, updating, by accessing the recorded RAID identifier of the intermediate RAID, the metadata of the target RAID to associate the target RAID with the second storage block, wherein updating the metadata of the target RAID includes:
removing the first storage block from the target RAID and adding the second storage block to the target RAID, wherein after updating the metadata of the target RAID, the RAID identifier of the target RAID indicates that the second storage block is included in the target RAID.

2. The method according to claim 1, further comprising:
copying data in a third storage block associated with the target RAID to a corresponding second storage space in the intermediate RAID;
wherein updating the metadata of the target RAID includes simultaneously disassociating the first storage block and the third storage block from the target RAID.

3. The method of claim 1, further comprising:
receiving, prior to copying the data, a write request to write new data in the first storage block; and
executing the write request to write the new data to both the first storage block and the second storage block.

4. The method of claim 1, further comprising:
prior to creating the intermediate RAID, identifying data in another storage block of the target RAID to be moved or copied in response to the target request;
after recording the RAID identifier of the intermediate RAID, copying the data in the another storage block to a second corresponding storage space in the intermediate RAID; and
wherein updating the metadata of the target RAID is in response to completing both copying the data in the first storage block and copying the data in the another storage block.

5. The method according to claim 1, wherein creating the intermediate RAID associated with the idle second storage block comprises:
determining that data in a third storage block associated with the target RAID does not need to be moved or copied; and creating the intermediate RAID based on the third storage block and the second storage block, so that the intermediate RAID is also associated with the third storage block.

6. The method according to claim 1, further comprising:
if the target request is a restriping request or a type conversion request, updating the target RAID by using metadata of the intermediate RAID, so that the target RAID is associated with the second storage block.

7. The method according to claim 6, wherein the intermediate RAID is inaccessible to users.

8. The method according to claim 1, wherein the target request is a type conversion request, and wherein creating the intermediate RAID comprises:
creating the intermediate RAID based on a RAID type specified by the type conversion request.

9. The method according to claim 1, wherein the target request is a rebalancing request, and the method further comprises:
removing, in response to completing the copy of the data, the target RAID; and
determining the intermediate RAID as a rebalanced RAID.

10. The method according to claim 9, wherein removing the target RAID comprises:
disassociating the target RAID and the first storage block; and
releasing the first storage block.

11. An electronic device, comprising:
at least one processing unit; and
at least one memory coupled to the at least one processing unit and storing instructions for execution by the at least one processing unit, wherein the instructions, when executed by the at least one processing unit, cause the device to perform actions comprising:
in response to a target request for a RAID, determining that data in a first storage block associated with the target RAID needs to be moved or copied, wherein the target request comprises one of the following: a restriping request, a type conversion request, or a rebalancing request;
creating an intermediate RAID associated with an idle second storage block;
recording, in metadata of the target RAID, a RAID identifier of the intermediate RAID indicating storage blocks to be included in the target RAID, the recorded RAID identifier being a different RAID identifier than a RAID identifier of the target RAID;
after recording the RAID identifier, copying the data in the first storage block to a corresponding storage space in the intermediate RAID to write at least part of the data in the second storage block; and
after copying the data in the first storage block to a corresponding storage space in the intermediate RAID, updating, by accessing the recorded RAID identifier of the intermediate RAID, the metadata of the target RAID to associate the target RAID with the second storage block, wherein updating the metadata of the target RAID includes:
removing the first storage block from the target RAID and adding the second storage block to the target RAID, wherein after updating the metadata of the target RAID, the RAID identifier of the target RAID indicates that the second storage block is included in the target RAID.

12. The electronic device according to claim 11, wherein creating the intermediate RAID associated with the idle second storage block comprises:
determining that data in a third storage block associated with the target RAID does not need to be moved or copied; and
creating the intermediate RAID based on the third storage block and the second storage block, so that the intermediate RAID is also associated with the third storage block.

13. The electronic device according to claim 11, wherein the actions further comprise:
if the target request is a restriping request or a type conversion request, updating the target RAID by using metadata of the intermediate RAID, so that the target RAID is associated with the second storage block.

14. The electronic device according to claim 13, wherein the intermediate RAID is inaccessible to users.

15. The electronic device according to claim 11, wherein the target request is a type conversion request, and wherein creating the intermediate RAID comprises:
creating the intermediate RAID based on a RAID type specified by the type conversion request.

16. The electronic device according to claim 11, wherein the target request is a rebalancing request, and the actions further comprise:
removing, in response to completing the copy of the data, the target RAID; and
determining the intermediate RAID as a rebalanced RAID.

17. The electronic device according to claim 16, wherein removing the target RAID comprises:
disassociating the target RAID and the first storage block; and
releasing the first storage block.

18. A computer program product having a non-transitory computer readable medium which stores a set of instructions to perform storage management; the set of instructions, when carried out by computerized circuitry, causing the computerized circuitry to perform a method of:
in response to a target request for a target redundant array of independent disks (RAID), determining that data in a first storage block associated with the target RAID needs to be moved or copied, wherein the target request comprises one of the following: a restriping request, a type conversion request, or a rebalancing request;
creating an intermediate RAID associated with an idle second storage block;
recording, in metadata of the target RAID, a RAID identifier of the intermediate RAID indicating storage blocks to be included in the target RAID, the recorded RAID identifier being a different RAID identifier than a RAID identifier of the target RAID;
after recording the RAID identifier, copying the data in the first storage block to a corresponding storage space in the intermediate RAID to write at least part of the data in the second storage block; and
after copying the data in the first storage block to a corresponding storage space in the intermediate RAID, updating, by accessing the recorded RAID identifier of the intermediate RAID, the metadata of the target RAID to associate the target RAID with the second storage block, wherein updating the metadata of the target RAID includes:
removing the first storage block from the target RAID and adding the second storage block to the target RAID, wherein after updating the metadata of the target RAID, the RAID identifier of the target RAID indicates that the second storage block is included in the target RAID.

19. The computer program product according to claim 18, wherein the target request is a rebalancing request, and the method further comprises:
   removing, in response to completing the copy of the data, the target RAID; and
   determining the intermediate RAID as a rebalanced RAID;
wherein the target RAID had been previously mapped with the first storage block; and
wherein removing the target RAID comprises:
   unmapping the target RAID and the first storage block; and
   releasing the first storage block.

* * * * *